H. W. PLEISTER.
CONDUIT OR CABLE CLAMP AND BRIDLE RING.
APPLICATION FILED NOV. 16, 1920.
1,381,237. Patented June 14, 1921.
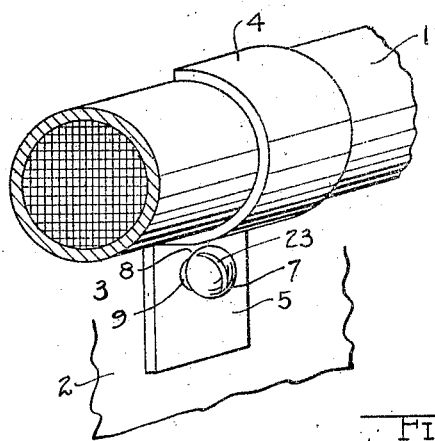
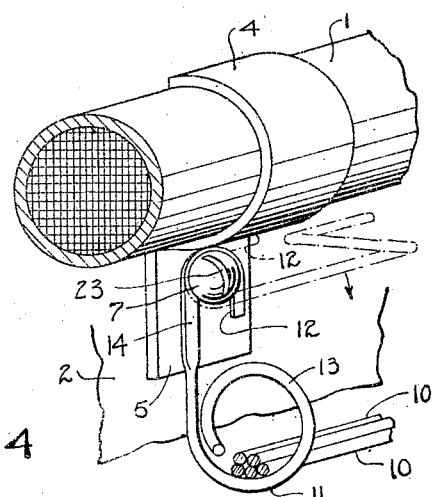
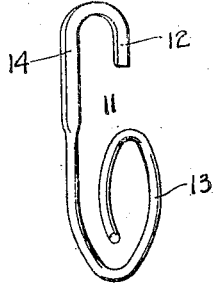
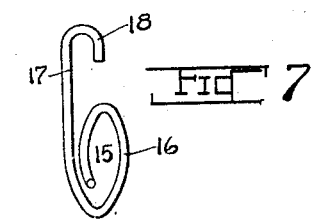
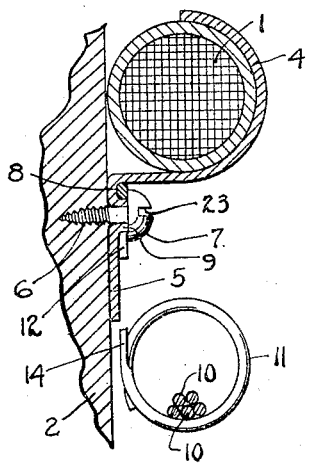
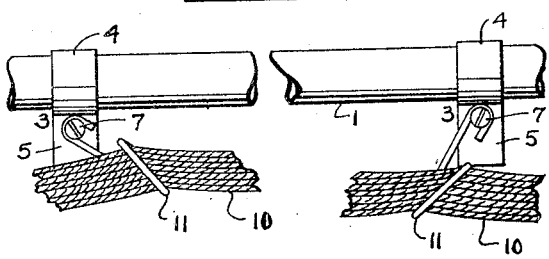
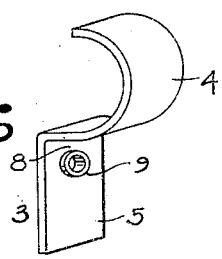
INVENTOR
Henry W. Pleister
BY
Alan H. Johnson
ATTORNEY

UNITED STATES PATENT OFFICE.

HENRY W. PLEISTER, OF WESTFIELD, NEW JERSEY, ASSIGNOR TO HENRY B. NEWHALL, EXECUTOR OF HENRY B. NEWHALL, SR., DECEASED.

CONDUIT OR CABLE CLAMP AND BRIDLE-RING.

1,381,237.  Specification of Letters Patent.  Patented June 14, 1921.

Application filed November 16, 1920. Serial No. 424,472.

*To all whom it may concern:*

Be it known that I, HENRY W. PLEISTER, a citizen of the United States, residing at Westfield, in the county of Union and State of New Jersey, have invented certain new and useful Improvements in Conduit or Cable Clamps and Bridle-Rings, of which the following is a specification, taken in connection with the accompanying drawings.

My invention relates to the combination of a conduit or cable clamp and a bridle ring, and also to a cable or conduit clamp and a bridle ring as sub-combinations of the main combination, and as articles of manufacture.

My invention further relates to a cable or conduit clamp, which can be manufactured at minimum expense and to which a bridle ring may be secured either at the original installation of the cable and conduit clamp, or at any future time when it may be desirable to support one or more runs of bridle wires.

My invention further relates to a conduit or cable clamp provided with integral means to space the head of the securing screw from the base to permit a bridle ring to be hooked under, and be secured by, the head of the securing screw, without loosening or tightening the screw to attach or detach the bridle ring.

My invention further relates to such a conduit or cable clamp having a hollow struck up boss of less diameter than the head of the securing screw to be employed with the clamp.

My invention further relates to a conduit or cable clamp which is preferably formed out of pressed sheet material, as pressed steel, or which may be formed from castings of malleable iron, brass, an alloy, aluminum or any other metal.

My invention further relates to certain combinations, sub-combinations, articles of manufacture, and details of construction, all of which will be more fully hereinafter described and pointed out in the claims.

In the figures, in which I have shown different embodiments of my invention, the same reference numerals refer to similar parts in the several figures.

Figure 1 is a perspective view of my conduit or cable clamp and of a cable which it supports;

Fig. 2 is a perspective view of the conduit or cable clamp shown in Fig. 1 with the addition of my bridle ring, and runs of bridle wires supported by the bridle ring. In this figure the bridle ring is shown in dotted lines in one of its attaching positions;

Fig. 3 is a vertical section through the conduit or cable clamp and bridle ring shown in Fig. 2;

Fig. 4 is a perspective view of my preferred form of bridle ring;

Fig. 5 is a side elevation of two conduit or cable clamps and bridle rings showing how the runs of bridle wires lock the bridle ring against accidental disengagement;

Fig. 6 is a perspective view of the preferred form of my conduit or cable clamp;

Fig. 7 is a perspective view of a modified form of bridle ring.

In the commercial use of conduit or cable clamps it is not generally possible, at the date of the original installation, to determine whether or not bridle rings will be needed to support additional loose strands of bridle wires. In commercial practice, a cable is supported on a wall or other suitable support and it may be weeks, months, or years later that the telephone engineers will determine that it is desirable to support bridle wires parallel to the cable.

By my invention my original conduit or cable clamp may be used as a separate article of manufacture or sub-combination, and then later, when the needs of the service demands it, my bridle ring may be supported by the same conduit or cable clamp, when the complete combination would be used.

In my invention the cable 1 is supported on a wall or other suitable support 2 by means of the conduit or cable clamp 3, having a hook portion 4, and a base 5. The clamp is held to the wall or other support 2 by means of a securing screw 6 having a head 7.

By my invention I firmly secure the base 5 of the conduit or cable clamp to the support 2 yet leave a space between the head 7 of the securing screw and the surface of the base 5. This space forms a channel 8, in which I hook a bridle ring without operating the screw 6, either to loosen or tighten it. It is well known that when screws are screwed into a support, then loosened, and a member inserted under the head of the screw, which is again tightened to clamp the member, the fastening is not as secure as it was originally for the screw cannot again fill the female threads in the support or penetrate as far as it did originally.

In the preferred construction of my invention shown in Figs. 1, 2, 3 and 6 the spacing member is formed as a hollow boss 9 struck up from the base and of less diameter than the head of the screw.

In first installing the cable 1 the screw 6 is screwed so that its head 7 engages firmly with the end of the hollow boss 9. After the screw is once positioned, the fastening is never weakened by again operating the screw to clamp anything under its head. Weeks, months or years later when the telephone or telegraph engineers may determine that it is advisable to increase the capacity of installation by stringing runs of bridle wires 10, 10, this may be readily done without loosening the screw 6 by simply hooking the hook of the bridle ring back of the head 7 of the screw. The bridle ring 11, having the open hook 12, is brought into a horizontal position so that the spacing member, which in the preferred form of my invention is the boss 9, will slip into the open hook 12. The bridle ring 11 is then pulled to the right by grasping the ring portion 13, to bring the hook 12 under the head 7 of the securing screw 6. The parts will then be in the position shown in dotted lines in Fig. 2. By then pulling down upon the bridle ring, in the direction of the arrow, it will be brought into the vertical position shown in full lines, Fig. 2, when the runs of bridle wires 10, 10 can be threaded through the ring portion 13. In this preferred construction the shank 14 of the bridle ring is preferably flattened.

I may in some cases, however, use a bridle ring 15, shown in Fig. 7 in which the ring 16, shank 17, and hook 18 are all formed of round wire.

The runs of bridle wires 10, 10 are not only supported by the bridle rings, but these bridle wires also serve as locks to prevent the bridle rings becoming accidentally disengaged from their respective conduit or cable clamps. With no runs of bridle wires the bridle rings 11, 11 can be swung up vertically into the position shown in dotted lines in Fig. 2; then moved laterally until the hook 12 escapes the head 7 of the securing screw. It will be seen, however, that after the runs of bridle wires have been located in the bridle rings, that these runs of bridle wires prevent the bridle rings 11, 11 being swung up sufficiently to permit their accidental disengagement from their respective conduit or cable clamps.

I preferably arrange the boss 9 on the base 5 adjacent to the hook 4 of the conduit or cable clamp. By this arrangement the channel 8 formed by the head 7 of the securing screw and the surface of the base 5 is bound or limited by the undersurface of the hook 4, which practically acts as a lock or stop to prevent the hook of the bridle ring being disengaged from the channel 8 by a vertical movement. When the boss is so located no amount of vibration of the bridle wires can cause the hook of the bridle ring to move vertically a sufficient distance to cause it to become disengaged from the channel 8. The undersurface of the hook 4 prevents this vertical movement. The bridle ring can therefore not be accidentally disengaged from the channel 8. It will have to be first brought into the horizontal position shown in dotted lines in Fig. 2, and then moved in a horizontal plane to permit its hook becoming disengaged from the channel 8. The hook 4 of the cable clamp, of course, does not prevent this movement. As previously explained, the bridle ring cannot be brought into this horizontal position accidentally on account of the bridle wires, see Fig. 5.

In my invention, it is immaterial whether the screw has rusted in the support 2, or whether or not the slot 23 of the screw has rusted to such an extent as to interfere with the ready insertion and manipulation of a screw driver. No screw driver, or other tool, is employed to attach the bridle rings to the conduit or cable clamp. Moreover, when the screw is once screwed home, the strength of the fastening is not weakened by unscrewing it, inserting a bridle ring behind its head, and again screwing it up, but to a less depth than it had been screwed originally.

Having thus described this invention in connection with illustrative embodiments thereof, to the details of which I do not desire to be limited, what is claimed as new and what is desired to secure by Letters Patent is set forth in the appended claims.

What I claim is:—

1. The combination in a conduit or cable clamp of a hook portion and a base provided with a hole for a securing screw, a securing screw, and means to space the head of the securing screw from the surface of the base to permit a bridle ring to hook under the head of the securing screw without loosening or tightening the securing screw.

2. A conduit or cable clamp provided with a hook portion and a base having a hole for a securing screw, and means to prevent the head of the securing screw contacting with the surface of the base, said means being of less diameter than the head of the securing screw to be used with the conduit or cable clamp.

3. A conduit or cable clamp provided with a hook portion and a base having a hollow boss struck up from the base, the opening in the boss adapted to receive a securing screw and keep its head from contacting with the surface of the base, said boss being of less diameter than the head of a securing screw.

4. The combination in a conduit or cable clamp of a hook portion and a base, a screw for securing the base to a wall or other suitable support, a bridle ring, and means to hook the bridle ring under the head of the securing screw without operating the securing screw.

5. The combination of a conduit or cable clamp having a hook portion to support a conduit or cable and a base to lie against a wall or other suitable support, the base being provided with means to prevent the head of the securing screw contacting with the surface of the base, said means being of less diameter than the head of the securing screw to be used with the conduit or cable clamp, and located adjacent to the under face of the hook so that said hook will form a lock or stop to prevent a bridle ring being disengaged by a vertical movement.

6. The combination in a conduit or cable clamp having a hook and a base, the base being provided with means to prevent the head of a securing screw contacting with the surface of the base, said means being of less diameter than the head of the securing screw and adapted to coöperate with the hook of a bridle ring, a bridle ring having a hook to coöperate with the said means, the parts being so located that the hook of the bridle ring cannot be engaged or disengaged in a vertical direction.

HENRY W. PLEISTER.

Witnesses:
    ALAN M. JOHNSON,
    GLADYS VAN LOAN.